(12) United States Patent
Yamazaki

(10) Patent No.: US 8,914,978 B2
(45) Date of Patent: Dec. 23, 2014

(54) APPLICATION ROLLER AND MANUFACTURING METHOD OF APPLICATION ROLLER

(75) Inventor: Nobuyuki Yamazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 151 days.

(21) Appl. No.: 13/494,059

(22) Filed: Jun. 12, 2012

(65) Prior Publication Data

US 2012/0318192 A1  Dec. 20, 2012

(30) Foreign Application Priority Data

Jun. 17, 2011  (JP) ................................ 2011-135327

(51) Int. Cl.
| | |
|---|---|
| *B23P 15/00* | (2006.01) |
| *B23P 17/00* | (2006.01) |
| *B21D 53/00* | (2006.01) |
| *F16C 13/00* | (2006.01) |
| *B41F 13/11* | (2006.01) |
| *H01M 4/04* | (2006.01) |
| *H01M 4/139* | (2010.01) |

(52) U.S. Cl.
CPC ............ *H01M 4/0404* (2013.01); *Y02E 60/122* (2013.01); *H01M 4/139* (2013.01)
USPC ............ 29/895.32; 29/527.2; 492/33; 492/49

(58) Field of Classification Search
CPC .. B21B 27/005; B21B 27/021; B21B 27/032; B21B 27/03; B21B 27/02; B21B 27/00; B29L 2031/324; B29C 41/042; B29C 41/22; D21F 3/08; D21F 3/086
USPC ............ 29/23.1, 895.32, 895.31, 895.3, 895; 118/DIG. 15; 492/30, 33, 34, 35, 36, 492/53, 56
See application file for complete search history.

(56) References Cited

U.S. PATENT DOCUMENTS

| | | | |
|---|---|---|---|
| 6,572,516 B2 * | 6/2003 | Clarke et al. ..................... | 492/30 |
| 2002/0072458 A1 | 6/2002 | Clarke et al. | |

FOREIGN PATENT DOCUMENTS

| | | |
|---|---|---|
| JP | 5-15824 | 1/1993 |
| JP | 6-269716 | 9/1994 |

* cited by examiner

*Primary Examiner* — Alexander P Taousakis
*Assistant Examiner* — Matthew P Travers
(74) *Attorney, Agent, or Firm* — Finnegan, Henderson, Farabow, Garrett & Dunner, LLP

(57) ABSTRACT

A manufacturing method of an application roller that applies a coating solution onto a surface of a substrate, wherein the application roller includes a roller body that includes a large diameter portion and small diameter portions coaxially extended from both ends of the large diameter portion, the manufacturing method includes: overlaying a resin layer on at least an outer periphery of each of the small diameter portions; forming a masking portion on the outer periphery of each of the small diameter portions by processing an outer periphery of the resin layer; and forming an application groove portion on an outer periphery of the large diameter portion.

8 Claims, 9 Drawing Sheets

APPLICATION ROLLER AND MANUFACTURING METHOD OF APPLICATION ROLLER

INCORPORATION BY REFERENCE

The disclosure of Japanese Patent Application No. 2011-135327 filed on Jun. 17, 2011 including the specification, drawings and abstract is incorporated herein by reference in its entirety.

BACKGROUND OF THE INVENTION

1. Field of the Invention

The present invention relates to a manufacturing method of an application roller that applies a coating solution onto a surface of a substrate and also relates to an application roller.

2. Description of Related Art

Electrodes (positive electrode and negative electrode) of a lithium ion secondary battery are each prepared by forming a thin film on the surface of the substrate such as aluminum foil or copper foil as a current collector. The thin film is formed by applying a paste including an active material and a binder resin onto the surface of the substrate and by drying the paste. Increasing drying rate of the paste is effective in reducing costs for equipment for performing such an application operation. However, inflow of hot air for drying the paste is likely to cause migration in which the binder resin is liberated from the active material in the applied paste and segregated in a depth direction of the applied paste. As such, it is a common practice to adopt a two-step coating process which includes first applying the binder resin onto the surface of the substrate and then overlaying a layer of a binder-free composition. The binder resin is necessary for binding an active material to the other active material and binding the active material to the substrate. When used in excess, however, the binder resin may interfere with the migration of lithium ions, impairing battery characteristics. In the light of the battery characteristics, therefore, high-precision control of the thickness of film which is formed by applying the binder resin solution onto the substrate is important.

However, the coating solution is normally applied to the substrate at a local area thereof and hence, an application roller need be masked in correspondence to an area not to be coated. Japanese Patent Application Publication No. 5-15824 (JP 5-15824 A) describes a method and apparatus for locally applying the coating solution with a masked application roller. According to JP 5-15824 A, an upper application roller forming a roll coater has a masking film of a predetermined width wrapped therearound. A lower feed roller of the roll coater is rotated so as to pass a substrate sheet through space between the upper and lower rollers while the coating solution is supplied to the space. Thus, the surface of the substrate sheet is locally coated with the coating solution except for an area corresponding to the portion of the upper application roller that is covered with the masking film. Such a technique is advantageous in that a desired coating application is accomplished simply by wrapping the easily available masking film around an outer periphery of the roller and that the application roller is easily adapted for the specifications of product to be coated by changing the shape of the masking film.

However, the coating technique described in JP 5-15824 A has the following problems. Firstly, the masking film, which has a given thickness, forms a step between an end of the masking film and the outer periphery of the application roller when wrapped around the application roller. The masking film must be reduced in thickness in order to reduce the step height. However, since the masking film is in friction contact with the outer periphery of the application roller being rotated, the masking film is prone to failure such as fractures or wrinkles if the masking film is made too thin. That is, the masking film is required of a given thickness (at least 10 to 20 μm). On the other hand, as shown in FIG. 7, a phenomenon occurs in which a coating solution P is drawn by surface tension to an edge F1 of a masking film F having the given thickness. In the neighborhood of the edge F1 of the masking film F, therefore, some coating solution is drawn by surface tension to be added to the coating solution retained by an application groove 101 so that an application roller 100 retains a larger amount of coating solution P near the edge of the masking film F than at a central portion thereof. This leads to a problem that a coating film W formed by applying the coating solution P onto a substrate K has a greater thickness H1 near an edge WE thereof than a thickness H2 at a central portion WC thereof, as shown in FIG. 8. According to the results of experiments made by the inventors, an increased edge thickness (H1-H2), that is, an increased amount of edge thickness near the edge WE relative to thickness at the central portion WC, was in the range of 200 to 300 nm, as shown in FIG. 9, in a case where masking films F having thicknesses in the range of 10 to 20 μm were used. The increased edge thickness accounts for 5 to 8% of the thickness of the coating film, having a significant influence on battery performance. Hence, there exists a demand for an application roller and a manufacturing method of the application roller that are adapted to reduce the increased edge thickness of the coating film as much as possible.

According to the coating technique disclosed in JP 5-15824 A, the masking film is simply wrapped around the application roller and hence, the position of the masking film relative to the application roller is unstable. This results in another problem that the coating film formed by applying the coating solution onto the substrate is varied in its edge position.

SUMMARY OF THE INVENTION

The invention provides an application roller and a manufacturing method of the application roller adapted to apply a coating solution onto a substrate without wrapping a masking film therearound so that the increased edge thickness of the coating film can be reduced and that an edge position of the coating film is stabilized.

A first aspect of the invention relates to a manufacturing method of an application roller that applies a coating solution onto a surface of a substrate, wherein the application roller includes a roller body that includes a large diameter portion and small diameter portions coaxially extended from both ends of the large diameter portion. The manufacturing method includes: overlaying a resin layer on at least an outer periphery of each of the small diameter portions; forming a masking portion on the outer periphery of each of the small diameter portions by processing an outer periphery of the resin layer; and forming an application groove portion on an outer periphery of the large diameter portion.

An outside diameter of the masking portion may be equal to the maximum diameter of the application groove portion. The resin layer may be overlaid on the outer periphery of the large diameter portion and the outer periphery of each of the small diameter portions such that the resin layer has a cylindrical column shape.

A cross-sectional shape of the application groove portion may include a ridge and a valley, and the maximum diameter of the application groove portion may equivalent to a diameter of the application groove portion at the ridge. In the application groove portion, half of a difference between the maximum diameter and the minimum diameter may be smaller than a distance between adjacent portions of the maximum diameter.

The resin layer may be overlaid on the outer periphery of the large diameter portion and the outer periphery of each of the small diameter portions so that the resin layer has a cylindrical column shape. The resin layer may include a first resin layer segment overlaid on the large diameter portion and a second resin layer segment overlaid on each of the small diameter portions, and the masking portion may be formed by simultaneously cutting the first resin layer segment and the second resin layer segment.

A second aspect of the invention relates to an application roller that applies a coating solution onto a surface of a substrate. The application roller includes: a roller body that includes a large diameter portion and small diameter portions coaxially extended from both ends of the large diameter portion; a masking portion formed on an outer periphery of a resin layer overlaid on an outer periphery of each of the small diameter portions; and an application groove portion formed on an outer periphery of the large diameter portion.

An outside diameter of the masking portion may be equal to the maximum diameter of the application groove portion.

The above-described configurations negates the need for wrapping the masking film around the roller when the coating solution is applied onto the substrate. Furthermore, the coating film can be reduced in the increased edge thickness. That is, the coating film formed by applying the coating solution onto the substrate is prevented from having a greater thickness near an edge thereof than a thickness at a central portion thereof so that the coating film is reduced in the difference in thickness (increased edge thickness) between the central portion and the edge portion thereof. In addition, the edge position of the coating film is stabilized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENT

An application roller and a manufacturing method of the application roller according to an embodiment of the invention will be described in detail with reference to the accompanying drawings. Now, description is made on a resin laminating step, a masking forming step and an application groove forming step in the order named. In the explanation of the individual steps, a structure of the application roller is also described as needed.

Figure 1:
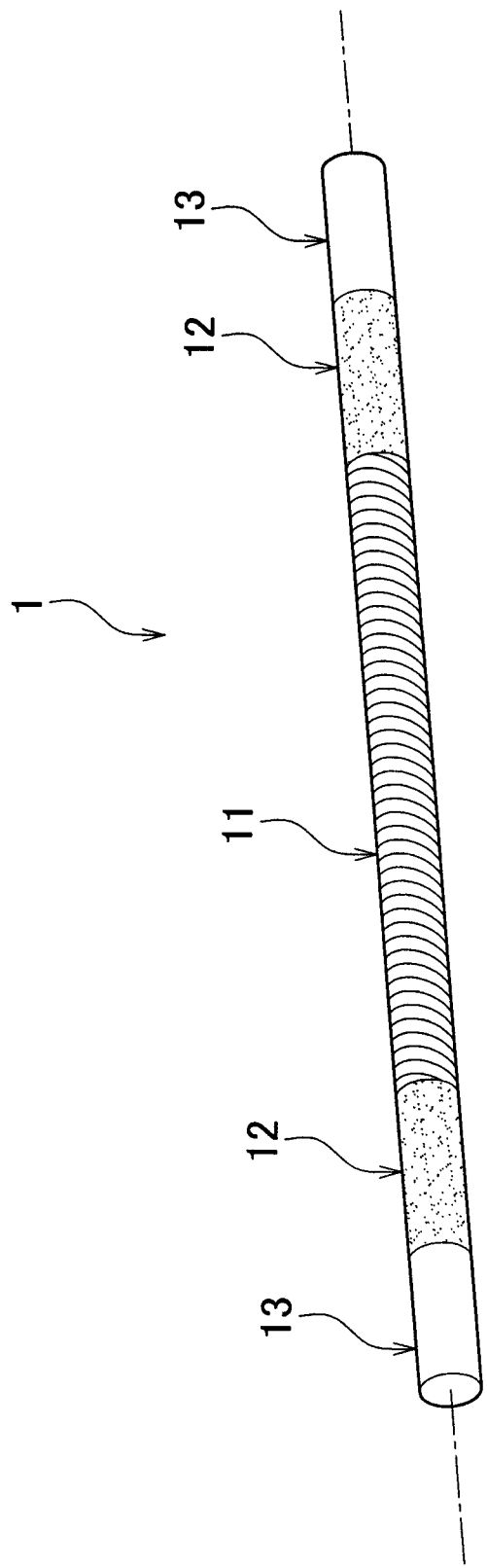
FIG. 1 is a perspective view showing an application roller according to an embodiment of the invention.
Figure 2:
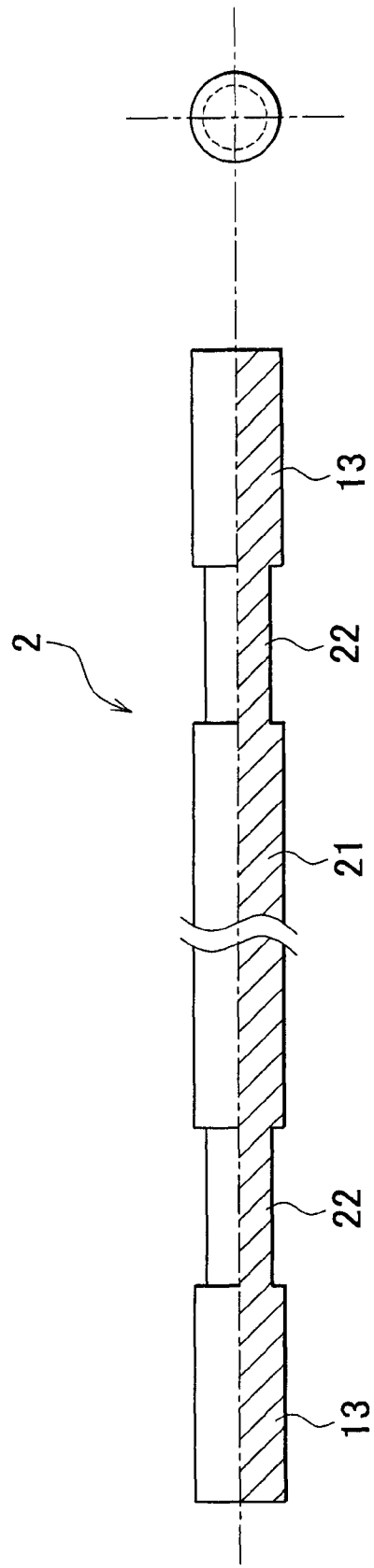
FIG. 2A is a front view showing a roller body (a lower half of which is shown in section) and FIG. 2B is a side view thereof.
Figure 3:
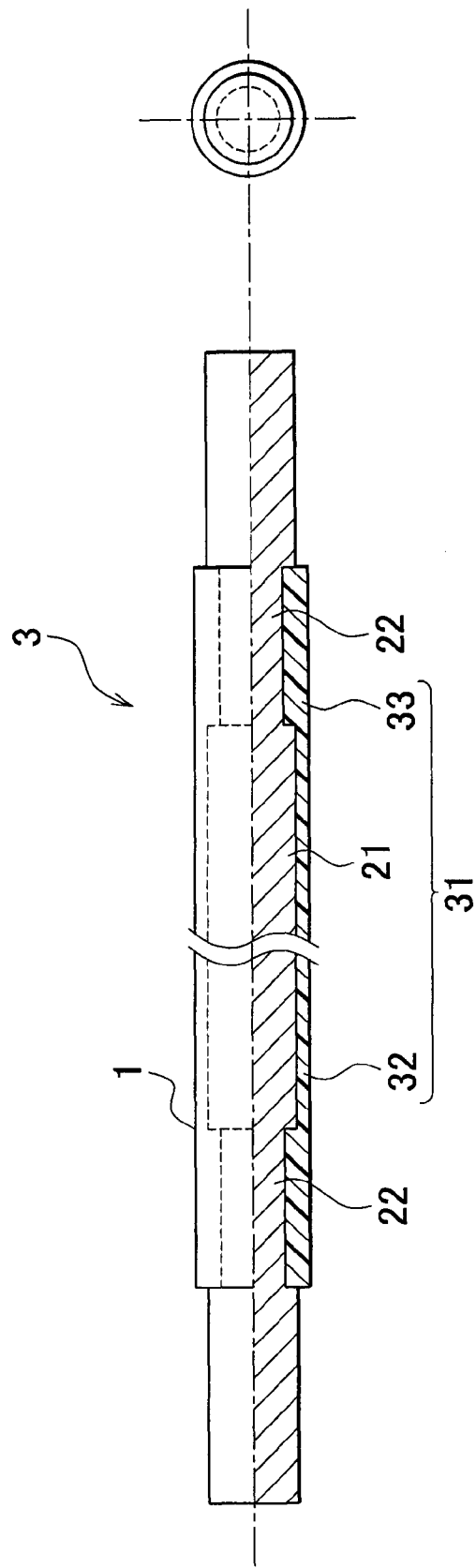
FIG. 3A is a front view showing the roller body (the lower half of which is shown in section) having a resin layer overlaid on outer periphery of a large diameter portion and outer periphery of each of small diameter portions thereof so that the resin layer has a cylindrical column shape and FIG. 3B is a side view thereof.

The resin laminating step is described first. FIG. 1 is a perspective view showing an application roller 1 according to the embodiment. FIG. 2A is a front view showing a roller body 2 (a lower half of which is shown in section), while FIG. 2B is a side view thereof. FIG. 3A is a front view showing the roller body 2 (the lower half of which is shown in section) having a resin layer 31 overlaid on outer periphery of a large diameter portion 21 and outer periphery of each of small diameter portions 22 thereof so that the resin layer has a cylindrical column shape, while FIG. 3B is a side view thereof. As shown in FIG. 1, the application roller 1 of the embodiment is a bar-shaped roller having a predetermined length. The application roller 1 includes an application groove portion 11, a masking portion 12 and a bearing portion 13. The application groove portion 11 is formed longitudinally centrally of the application roller 1. The application groove portion 11 has a longitudinal length so defined as to correspond to a width of a coating film to be formed by applying a coating solution onto a surface of a substrate. The application groove portion 11 has the length in the range of 200 to 400 mm, for example. The application groove portion 11 includes a spiral application groove formed on the application roller 1. A substrate K is a current collector used for electrodes of a lithium ion secondary battery. In this embodiment, a current collector of a positive electrode employs aluminum foil, while a current collector of a negative electrode employs copper foil. An aqueous binder solution that is primarily composed of styrene-butadiene rubber (SBR) is used as a coating solution P. The masking portions 12 are formed on the both sides of the application groove portion 11 by processing an outer periphery of the resin layer 31 overlaid on the roller body 2 to be described hereinlater. The masking portion 12 has a longitudinal length so defined as to correspond to a dimension of an area of the substrate that is not covered with the coating film formed on the substrate by applying the coating solution thereto. The masking portion 12 has the length in the range of 50 to 100 mm, for example. The resin layer 31 employs, for example, a fluorine-based resin in the light of durability, water-repellent property and the like. The bearing portions 13 are formed at both longitudinal ends of the application roller 1, next to the masking portions 12. The bearing portion 13 normally has a waterproof bearing fitted thereon.

As shown in FIG. 2A and FIG. 2B, the roller body 2 includes the large diameter portion 21 disposed at a longitudinally central portion thereof and the small diameter portions 22 coaxially extended from the both ends of the large diameter portion 21. Each of the bearing portions 13 is located distal to the corresponding one of small diameter portions 22. The large diameter portion 21 defines a portion formed with the application groove portion 11 on the outer periphery thereof. Each of the small diameter portions 22 defines a portion on which the resin layer defining the masking portion 12 is overlaid. A difference in outside diameter between the large diameter portion 21 and each of the small diameter portions 22 is defined principally taking into consideration fluidity of a masking resin being injection-molded as well as resin durability during the use of the application roller, flexibility of the roller body 2 and the like. The difference in outside diameter between the large diameter portion 21 and each of the small diameter portions 22 is in the range of 0.1 to 1% of the outside diameter of the large diameter portion 21. The roller body 2 is formed of stainless steel in the light of rigidity, corrosion resistance and the like. It is desirable that at least each of the small diameter portions 22 is subjected to a blasting process using glass beads because the glass bead blasted short diameter portion is expected to offer an effect to anchor the laminated resin layer 31, which defines the masking portion 12.

As shown in FIG. 3A and FIG. 3B, a first intermediate product 3 is fabricated by overlaying the resin layer 31 on the outer periphery of the large diameter portion 21 and the outer periphery of each of the small diameter portions 22 of the roller body 2 so that the resin layer 31 has a cylindrical column shape. Namely, the first intermediate product 3 has the cylindrical column shape. The resin layer 31 is normally overlaid by an insert molding process in which a resin is injected into a mold in which the roller body 2 is inserted. A difference is also produced in the thickness of the resin layer 31 in correspondence to the difference in the outside diameter between the large diameter portion 21 and each of the small diameter portions 22 of the roller body 2. The resin layer 31 having the different thicknesses is cooled at different rates so that the injection molded layer suffers difference in shrinkage amount (shrinkage strain) during cooling. As a result, in the first intermediate product 3, the shrinkage strain may give rise to unevenness on the outer periphery of the resin layer 31 in the vicinity of a boundary between a resin layer segment 32 overlaid on the large diameter portion 21 and a resin layer segments 33 overlaid on each of the small diameter portions 22.

Figure 4:
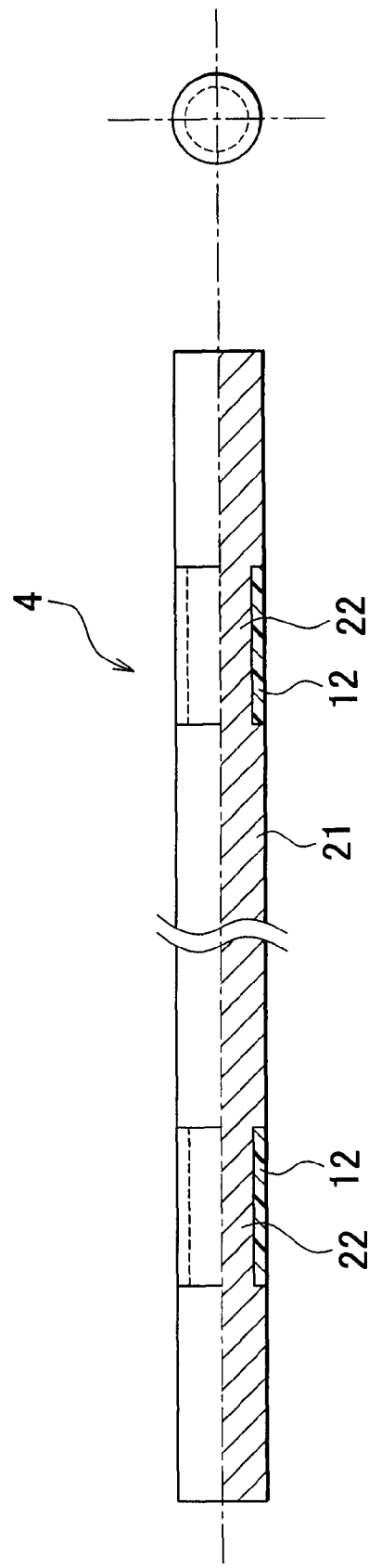
FIG. 4A is a front view showing the roller body (the lower half of which is shown in section) formed with a masking portion on the outer periphery of each of the small diameter portions by processing an outer periphery of the resin layer and FIG. 4B is a side view thereof.

Next, the masking forming step is described. FIG. 4A is a front view showing the roller body (the lower half of which is shown in section) formed with the masking portion 12 on the outer periphery of each of the small diameter portions 22 by processing the outer periphery of the resin layer 31 and FIG. 4B is a side view thereof. As shown in FIG. 4A and FIG. 4B, a second intermediate product 4 is fabricated by forming the masking portion 12 on the outer periphery of each of the small diameter portions 22. The masking portion is formed by processing the outer periphery of the resin layer 31 overlaid in the resin laminating step. In this process, an even masking surface is formed by removing, from the outer periphery of the resin layer 31, the unevenness induced by the shrinkage strain. A method of processing the outer periphery of the resin layer 31 may be exemplified by a cutting process using a lathe. In general, the cutting work using the lathe can adjust an outside diameter of a bar-shaped member within a tolerance of several μm. It should be noted, however, that the resin exhibits much greater expansion or shrinkage according to change in temperature than metal does. This dictates the need for setting dimensional tolerances for working the resin layer based on temperature conditions for use of the roller. In consideration of temperature rise during the cutting work, therefore, the dimensional tolerances may be set so that the masking portion has the same outside diameter as that of the large diameter portion under working temperatures of the application roller 1 by working the resin layer 31 to make an outside diameter of the masking portion 12 equal to or slightly larger than that of the large diameter portion 21.

The difference in outside diameter between the large diameter portion 21 and the masking portion 12 is reduced by simultaneously working the resin layer segment 32 overlaid on the large diameter portion 21 and the resin layer segment 33 overlaid on each of the small diameter portions 22 whereby an outer peripheral surface of the large diameter portion 21 is made flush with an outer peripheral surface of the masking portion 12. This process is done because if a step exists at a boundary between the large diameter portion 21 and the masking portion 12, the surface tension draws some coating solution P to the step, inducing an increase in edge thickness of the coating film. The surface of the masking portion 12 is adjusted to have a roughness required for sealing the coating solution P. In a case where the coating solution P has a low viscosity, for example, the surface roughness of the masking portion 12 need be adjusted as low as possible.

Figure 5:
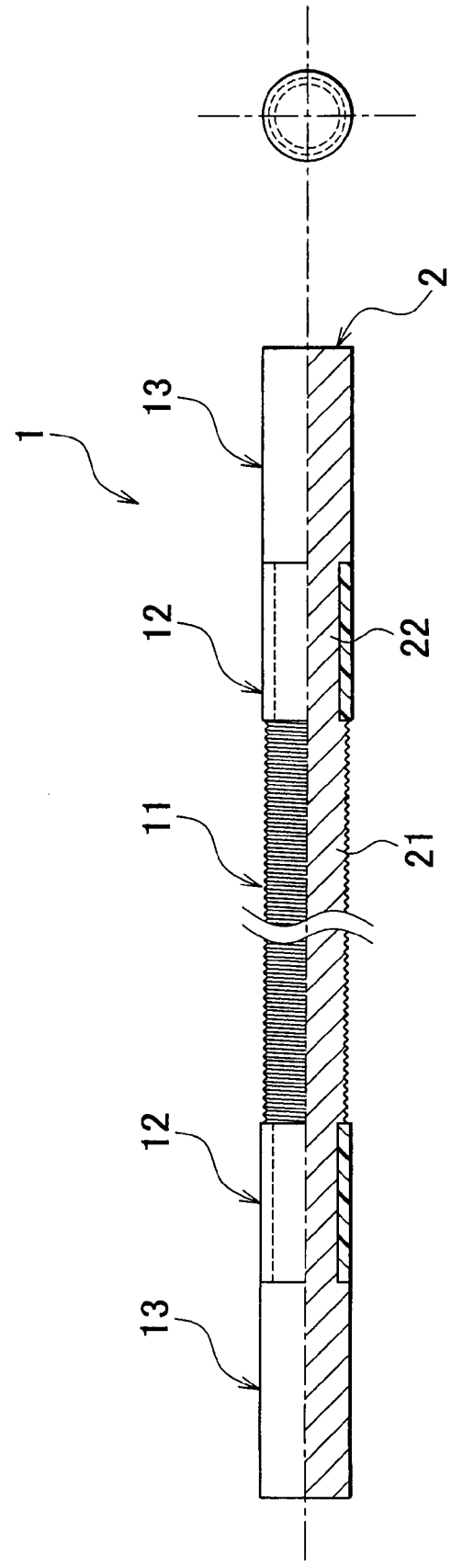
FIG. 5A is a front view showing the roller body (the lower half of which is shown in section) formed with an application groove portion on the outer periphery of the large diameter portion and FIG. 5B is a side view thereof.
Figure 6:
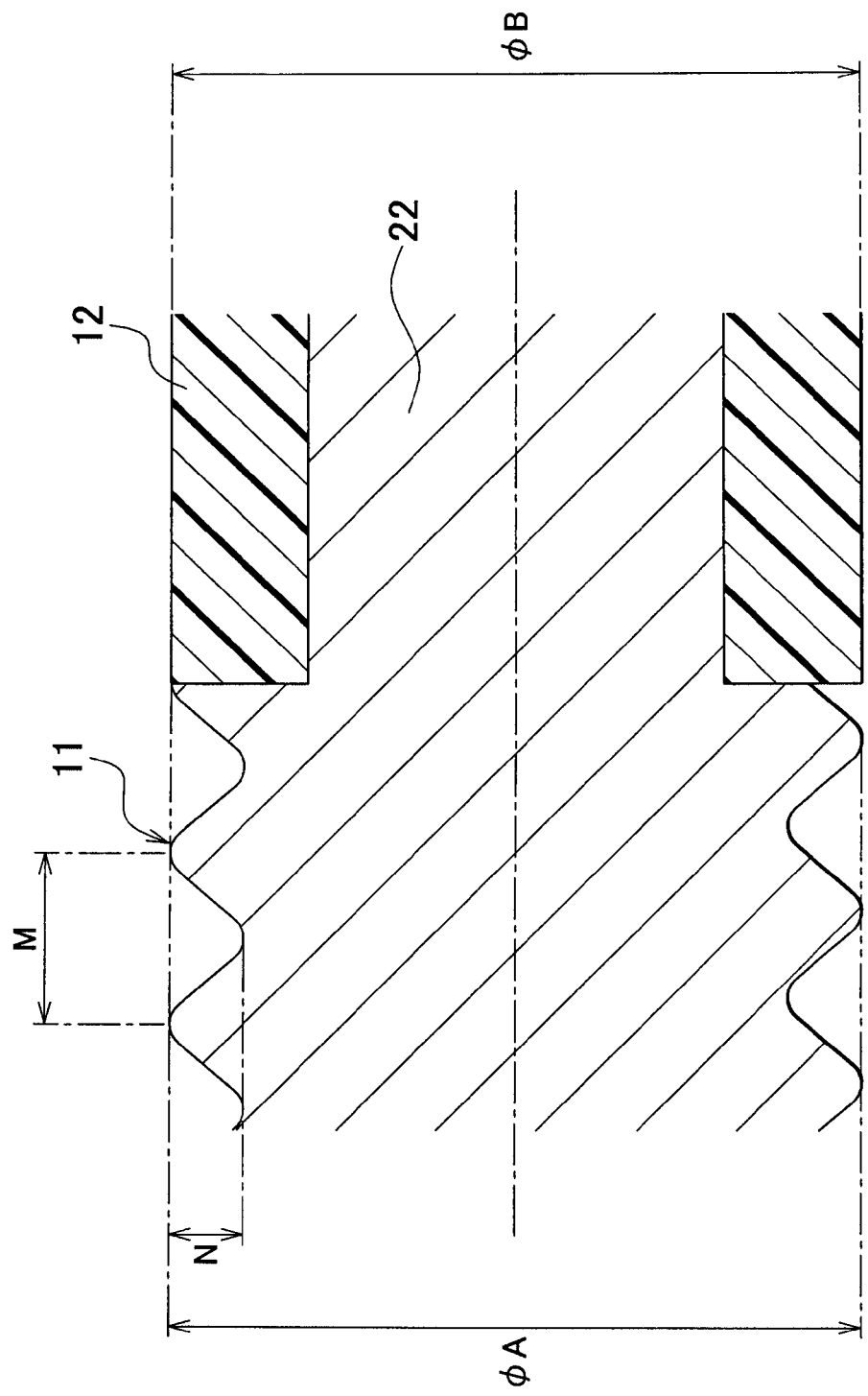
FIG. 6 is an enlarged sectional view showing the application groove portion and the masking portion.
Figure 7:
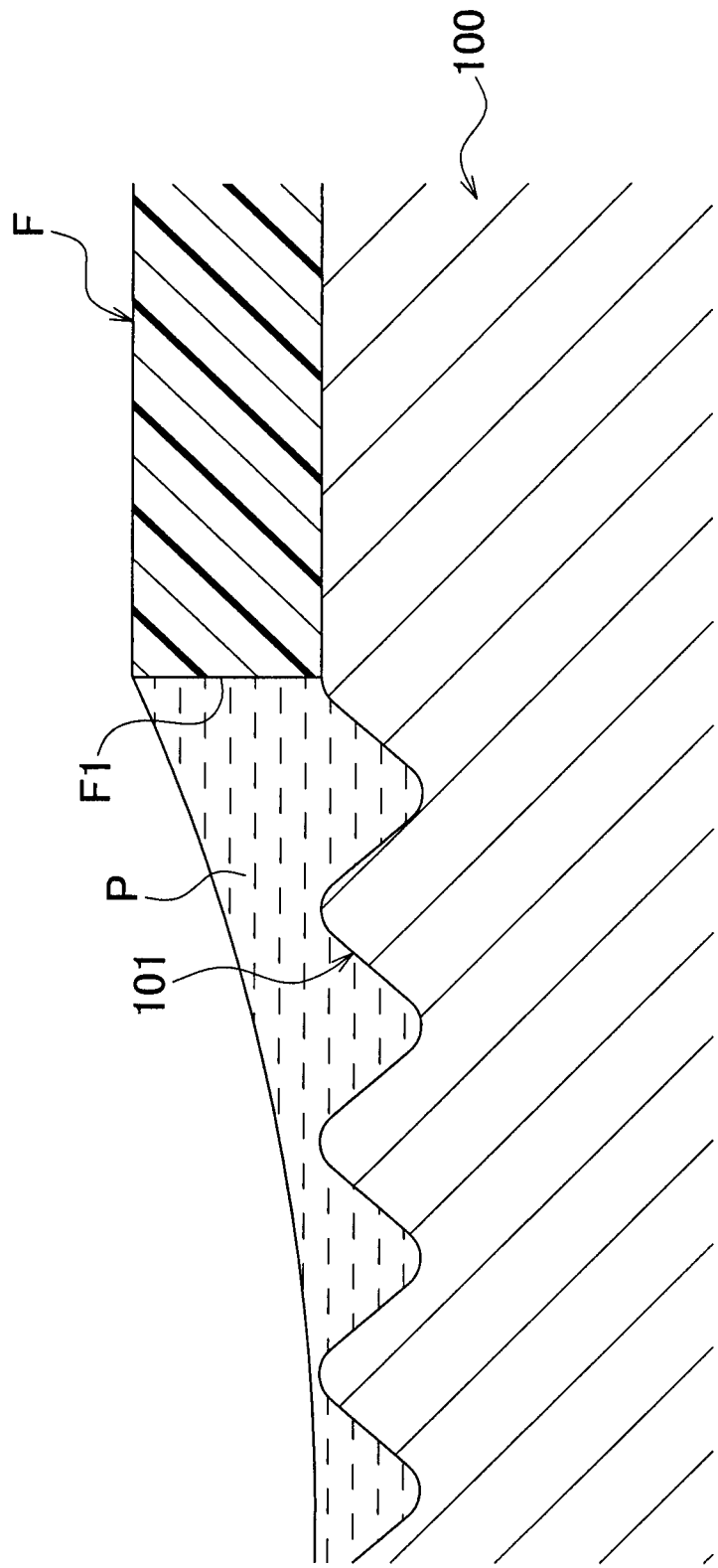
FIG. 7 is a diagram illustrating a phenomenon in which the coating solution is drawn by surface tension to an edge of a masking film wrapped around a conventional application roller.
Figure 8:
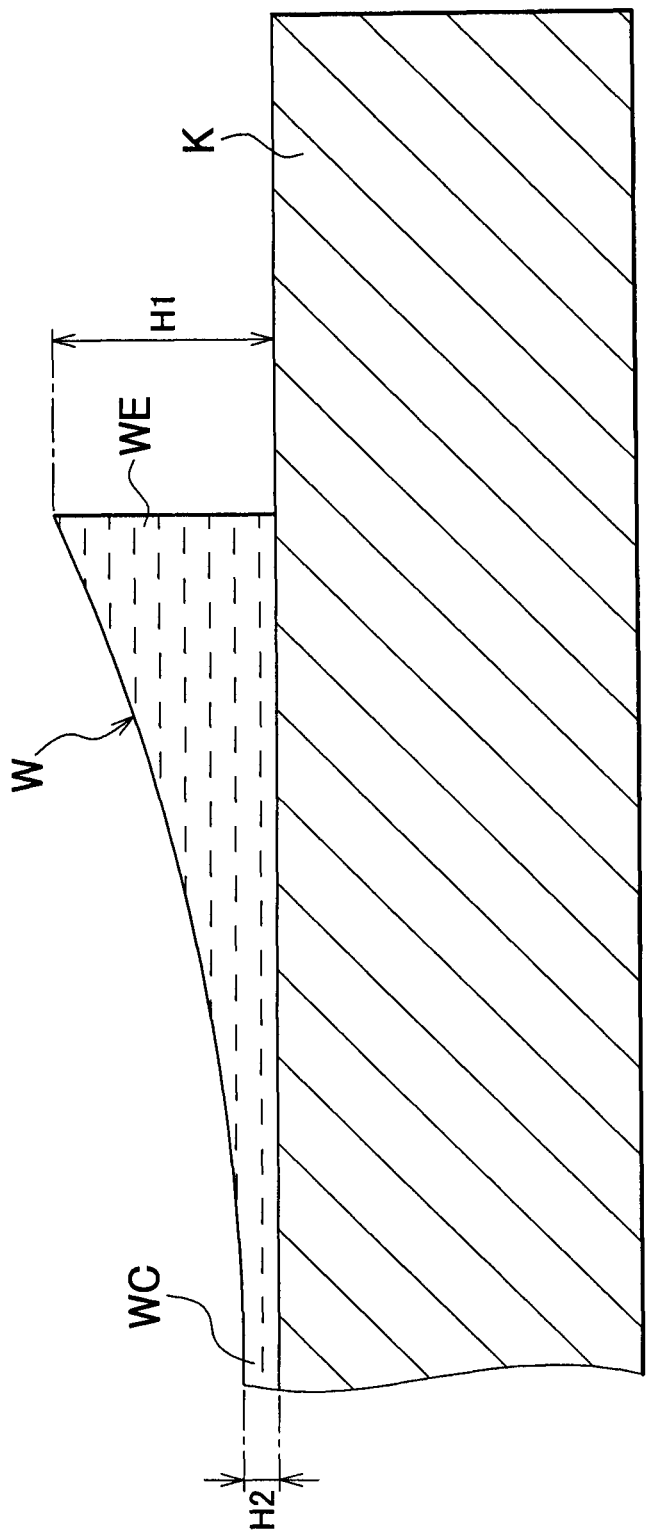
FIG. 8 is a diagram illustrating an increased edge thickness of a coating film formed by using the conventional application roller.
Figure 9:
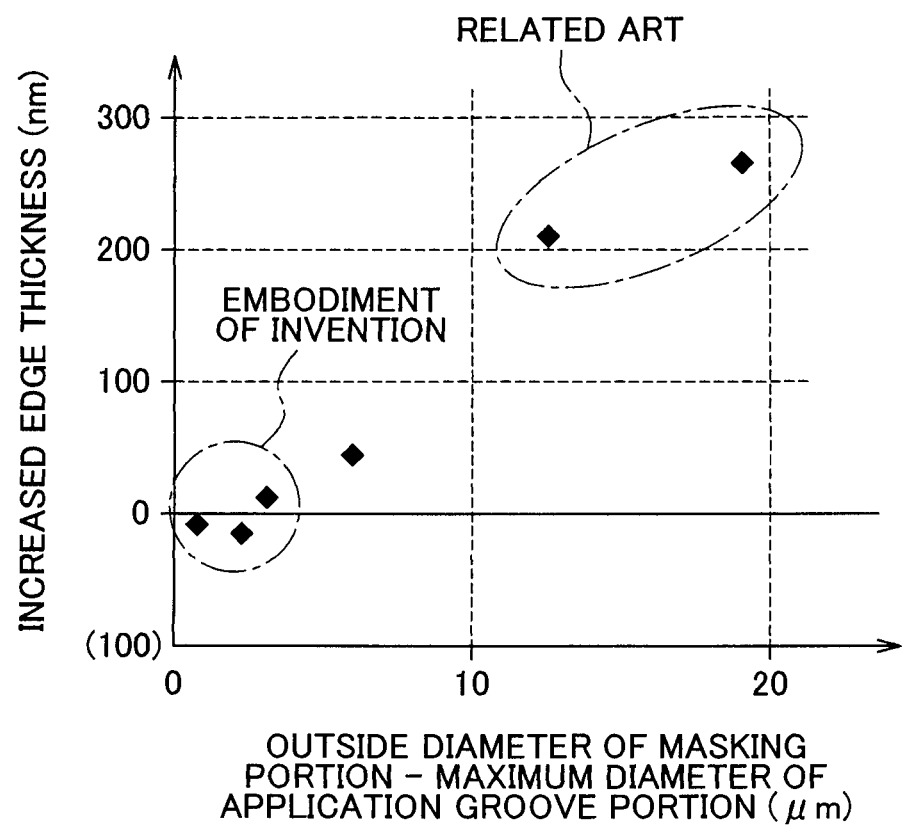
FIG. 9 is a graph showing a correlation between an increased edge thickness and a difference between an outside diameter of the masking portion and the maximum diameter of the application groove portion.

Next, the application groove forming step is described. FIG. 5A is a front view showing the roller body 2 (the lower half of which is shown in section) formed with the application groove portion 11 on the outer periphery of the large diameter portion 21 and FIG. 5B is a side view thereof. FIG. 6 is an enlarged sectional view showing the application groove portion 11 and the masking portion 12. As shown in FIG. 5A and FIG. 5B, the application roller 1 is fabricated by forming the application groove portion 11 on the outer periphery of the large diameter portion 21. Examples of a method of forming the application groove portion 11 include a cutting process using a lathe, and a rolling process using rolling dies. In the process for forming the application groove portion 11, a tubular cover may preferably be attached on the masking portion 12 in order not to damage the masking portion 12. As shown in FIG. 6, the application groove portion 11 is formed in a manner such that the maximum diameter $\Phi A$ of the application groove portion 11 is equal to the outside diameter $\Phi B$ of the masking portion 12 (the maximum radius of the application groove portion 11 is equal to the radius of the masking portion 12) under the working temperatures of the application roller. The application groove portion 11 has a cross-sectional shape open toward the outer periphery thereof. While the cross-sectional shape of the application groove portion 11 is defined by a sine curve (wavy line) shown in FIG. 6, for example, the cross-section thereof may also be defined by a zigzag line or a truncated zigzag line. That is, the cross-sectional shape of the application groove portion 11 includes ridges and valleys and a diameter as determined at the ridge of the application groove portion 11 (twice the radius as determined at the ridge of the application groove portion 11) is equivalent to the maximum diameter of the application groove portion 11. In a case where the coating solution has a high viscosity, such as the aqueous binder solution, the coating film is prone to be ruffled on the surface. Hence, the application groove portion 11 is configured such that a groove depth N is smaller than a groove pitch M. Here, the groove pitch M corresponds to a distance between adjacent portions of maximum diameter adjacent (distance between adjacent ridges). The groove depth N corresponds to half of difference between the maximum diameter and the minimum diameter (the diameter as determined at the valley) of the application groove portion 11.

As described in detail above, the manufacturing method of the application roller 1 according to the embodiment includes the resin laminating step in which the resin layer 31 is overlaid on at least outer periphery of each of the small diameter portions 22, from among the outer periphery of the large diameter portion 21 and the outer periphery of each of the small diameter portions 22 coaxially extended from the both ends of the large diameter portion 21, and the masking forming step in which the masking portion 12 is formed on the outer periphery of each of the small diameter portions 22 by processing the outer periphery of the resin layer 31. Unlike the technique disclosed in JP 5-15824 A, this method requires no masking film to be wrapped around the application roller. Therefore, this method is less likely to induce the phenomenon in which the coating solution is drawn by surface tension to the edge of the masking film having the predetermined thickness. Thus, the coating film P is prevented from having the greater thickness near the edge thereof than the thickness at the central portion thereof.

Specifically, the embodiment achieved the difference between the outside diameter of the masking portion 12 and the maximum diameter of the application groove portion 11 in the range of 0 to 5 μm and the increased edge thickness of 10 nm or less. It was confirmed that this increased edge thickness, which accounts for 1% or less of the thickness of the coating film, has little influence on the battery performance. Incidentally, the thickness of the coating film was measured by spectroscopic ellipsometry. Further, the positional relation between the masking portion 12 and the application groove portion 11 is not varied because the masking portion 12 is formed on the outer periphery of each of the small diameter portions 22 of the roller body 2 while the application groove portion 11 is formed on the outer periphery of the large diameter portion 21 of the roller body 2. Accordingly, the coating solution P applied onto the substrate K forms the coating film having the stable edge position. Thus is provided the manufacturing method of the application roller 1 which is adapted to apply the coating solution P onto the substrate K without wrapping the masking film therearound so that the increased edge thickness of the coating film is reduced and that the edge position of the coating film is stabilized.

According to the embodiment, the outside diameter of the masking portion 12 is equal to the maximum diameter of the application groove portion 11 under the working temperatures of the application roller. Accordingly, the use of the application roller 1 does not entail the formation of the step at the boundary between the application groove portion 11 and the masking portion 12. Hence, the masking portion 1 does not encounter the phenomenon in which the coating solution P is drawn by surface tension to the edge thereof. As a result, the coating solution P applied onto the substrate K is prevented from forming the coating film which has the greater thickness near the edge thereof than the thickness at the central portion thereof.

According to the embodiment, in the resin laminating step, the resin layer 31 is overlaid on the outer periphery of the large diameter portion 21 and the outer periphery of each of the small diameter portions 22 so that the resin layer has the cylindrical column shape. In the masking forming step, the masking portion is formed by simultaneously cutting the resin layer segment 32 overlaid on the large diameter portion 21 and the resin layer segment 33 overlaid on each of the small diameter portions 22. Therefore, the shrinkage strains produced in the resin layer 31 during the formation of the resin layer 31 on the outer periphery of the large diameter portion 21 and the outer periphery of each of the small diameter portions 22 can be removed by one cutting step. The outer peripheral surface of the large diameter portion 21 is made flush with the outer peripheral surface of the masking portion 12. This minimizes the possibility of forming the step or gap between the application groove portion 11 and the masking portion 12.

According to the embodiment, the application roller 1 that applies the coating solution P onto the surface of the substrate K includes: the roller body 2 that includes the large diameter portion 21 and the small diameter portions 21 coaxially extended from the both ends of the large diameter portion 21; the masking portion 12 formed on the outer periphery of the resin layer 31 overlaid on at least outer periphery of each of the small diameter portions 22; and the application groove portion 11 formed on the outer periphery of the large diameter portion 21. Therefore, the application roller can apply the coating solution P onto the substrate K without wrapping the masking film therearound so that the increased edge thickness of the coating film can be reduced, while the edge position of the coating film is stabilized.

Specifically, according to the embodiment, the roller body 2 is provided with the large diameter portion 21 and the small diameter portions 22, and the masking portion 12 is formed by processing the outer periphery of the resin layer 3 overlaid on the outer periphery of each of the small diameter portions 22. Therefore, the embodiment negates the need for wrapping the masking film around the application roller as disclosed in JP 5-15824 A. This reduces the incidence of the phenomenon in which the coating solution is drawn by surface tension to the edge of the masking film having the predetermined thickness. Hence, the coating film is prevented from having the greater thickness near the edge thereof than the thickness at the central portion thereof. Further, the masking portion 12 is formed on the outer periphery of each of the small diameter portions 22 of the roller body 2, while the application groove portion 11 is formed on the outer periphery of the large diameter portion 21 of the roller body 2. Therefore, the positional relation between the masking portion 12 and the application groove portion 11 is not varied. This ensures that the edge position of the coating film formed by applying the coating solution P onto the substrate K is stabilized.

According to the embodiment, the outside diameter of the masking portion 12 is equal to the maximum diameter of the application groove portion 11 under the working temperatures of the application roller. Hence, the use of the application roller 1 does not entail the formation of the step at the boundary between the application groove portion 11 and the masking portion 12. Accordingly, the masking portion 12 does not encounter the phenomenon in which the coating solution is drawn by surface tension to the edge thereof. As a result, the coating solution P applied onto the substrate K is prevented from forming the coating film which has the greater thickness near the edge thereof than the thickness at the central portion thereof.

The application roller and the manufacturing method of the application roller according to the invention are not limited to the above-described embodiment, and may be applied in various modifications as below. The application groove portion 11 of the embodiment is provided at one longitudinal central portion of the application roller, but is not always limited to one location. A plurality of application groove portions 11 may be provided at plural locations in a case where plural pieces of coating film are formed within the range of the width of the substrate K. Although the resin layer 31 is overlaid on the large diameter portion 21 and the small diameter portions 22 according to the embodiment, the resin layer may also be overlaid on the large diameter portion 21, the small diameter portions 22 and the bearing portions 13. In this case, when each of the small diameter portions 22 and each of bearing portions 13 have different outside diameters, this approach allows for the elimination of the shrinkage strain produced between each of the small diameter portions 22 and each of the bearing portions 13. According to the embodiment, the outside diameter of the masking portion 12 is set to be equal to the maximum diameter of the application groove portion 11 under the working temperatures of the application roller. If the increased edge thickness is within the allowable range, however, the masking portion 12 may have a larger outside diameter than the outside diameter of the application groove portion 11. Since the masking portion 12 is formed from a resin material, the masking portion 12 is prone to settling or wear. However, the masking portion 12, which is increased in the outside diameter, is increased in durability.

What is claimed is:

1. A manufacturing method of an application roller that applies a coating solution onto a surface of a substrate, the manufacturing method comprising:
    providing a roller body that includes a large diameter portion and small diameter portions coaxially extending from both ends of the large diameter portion;
    overlaying a resin layer on at least an outer periphery of each of the small diameter portions;
    forming a masking portion on the outer periphery of each of the small diameter portions by processing an outer periphery of the resin layer; and
    forming an application groove portion on an outer periphery of the large diameter portion, adjacent to the masking portion,
    wherein an application groove of the application groove portion is formed by processing the large diameter portion of the roller body such that the application groove portion is defined in the roller body itself.

2. The manufacturing method of the application roller according to claim 1, wherein an outside diameter of the masking portion is equal to the maximum diameter of the application groove portion.

3. The manufacturing method of the application roller according to claim 2, wherein:
    a cross-sectional shape of the application groove portion includes a ridge and a valley; and
    the maximum diameter of the application groove portion is equivalent to a diameter of the application groove portion at the ridge.

4. The manufacturing method of the application roller according to claim 2, wherein in the application groove portion, half of a difference between the maximum diameter and the minimum diameter is smaller than a distance between adjacent portions of the maximum diameter.

5. The manufacturing method of the application roller according to claim 1, wherein the resin layer is overlaid on the outer periphery of the large diameter portion and the outer periphery of each of the small diameter portions so that the resin layer has a cylindrical column shape.

6. The manufacturing method of the application roller according to claim 5, wherein:
    the resin layer includes a first resin layer segment overlaid on the large diameter portion and a second resin layer segment overlaid on each of the small diameter portions; and
    the masking portion is formed by simultaneously cutting the first resin layer segment and the second resin layer segment.

7. An application roller that applies a coating solution onto a surface of a substrate, comprising:
    a roller body that includes a large diameter portion and small diameter portions coaxially extended from both ends of the large diameter portion;
    a resin layer overlaid on the roller body on an outer periphery of each of the small diameter portions, the resin layer forming a masking portion; and
    an application groove portion formed on an outer periphery of the large diameter portion,
    wherein the masking portion is provided on both ends of the application groove portion, and
    wherein the application groove portion is defined in the roller body itself.

8. The application roller according to claim 7, wherein an outside diameter of the masking portion is equal to the maximum diameter of the application groove portion.

* * * * *